US010352277B2

(12) United States Patent
    Ito

(10) Patent No.: US 10,352,277 B2
(45) Date of Patent: Jul. 16, 2019

(54) INTAKE APPARATUS OF INTERNAL COMBUSTION ENGINE

(71) Applicant: AISIN SEIKI KABUSHIKI KAISHA, Kariya-shi, Aichi-ken (JP)

(72) Inventor: Atsushi Ito, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 184 days.

(21) Appl. No.: 15/514,734

(22) PCT Filed: Nov. 5, 2015

(86) PCT No.: PCT/JP2015/081216
    § 371 (c)(1),
    (2) Date: Mar. 27, 2017

(87) PCT Pub. No.: WO2016/084576
    PCT Pub. Date: Jun. 2, 2016

(65) Prior Publication Data
    US 2017/0241377 A1    Aug. 24, 2017

(30) Foreign Application Priority Data

Nov. 25, 2014  (JP) .................................. 2014-237318

(51) Int. Cl.
    *F02M 26/20*    (2016.01)
    *F02M 35/112*   (2006.01)
    (Continued)

(52) U.S. Cl.
    CPC ............. *F02M 26/20* (2016.02); *F02B 47/08* (2013.01); *F02M 26/17* (2016.02); *F02M 26/37* (2016.02);
    (Continued)

(58) Field of Classification Search
    CPC ........ F02M 26/17; F02M 26/20; F02M 26/37; F02M 26/44; F02M 35/10222
    See application file for complete search history.

(56) References Cited

U.S. PATENT DOCUMENTS 7,305,958 B2    12/2007  Doko et al.
8,051,843 B2 *  11/2011  Matsudaira ............ F02M 26/42
                                                     123/568.11
(Continued)

FOREIGN PATENT DOCUMENTS

JP    2000-008968 A    1/2000
JP    2003-239816 A    8/2003
JP    2006-241992 A    9/2006

OTHER PUBLICATIONS

International Search Report (PCT/ISA/210) dated Jan. 12, 2016, by the Japanese Patent Office as the International Searching Authority for International Application No. PCT/JP2015/081216.
(Continued)

*Primary Examiner* — Hung Q Nguyen
*Assistant Examiner* — Mark L. Greene
(74) *Attorney, Agent, or Firm* — Buchanan Ingersoll & Rooney PC

(57) ABSTRACT

In an intake apparatus of an internal combustion engine, an EGR gas inlet port of each of plural EGR gas distribution pipes is provided at a position at which a volume of an intake port from a surge tank to the EGR gas inlet port is equal to or greater than a volume of an EGR gas introduced to an intake pipe from each of the EGR gas distribution pipes during one cycle of the internal combustion engine and at a position towards the surge tank relative to a center of the intake port in a flow direction thereof.

7 Claims, 4 Drawing Sheets

(51) Int. Cl.
*F02M 35/10* (2006.01)
*F02M 26/17* (2016.01)
*F02M 26/37* (2016.01)
*F02M 26/44* (2016.01)
*F02B 47/08* (2006.01)

(52) U.S. Cl.
CPC ............ *F02M 26/44* (2016.02); *F02M 35/10* (2013.01); *F02M 35/10222* (2013.01); *F02M 35/112* (2013.01); *Y02T 10/121* (2013.01)

(56) References Cited

U.S. PATENT DOCUMENTS

| | | | |
|---|---|---|---|
| 9,249,765 B2 * | 2/2016 | Senda | F02M 35/104 |
| 9,273,652 B2 * | 3/2016 | Ito | F02M 35/10222 |
| 10,113,519 B2 * | 10/2018 | Ito | F02M 35/10091 |
| 2009/0293831 A1 * | 12/2009 | Harada | F02M 35/10085 |
| | | | 123/184.53 |
| 2017/0211519 A1 * | 7/2017 | Ito | F02M 35/104 |
| 2018/0119655 A1 * | 5/2018 | Ito | F02M 35/104 |
| 2018/0283325 A1 * | 10/2018 | Nagata | F02M 26/19 |

OTHER PUBLICATIONS

Written Opinion (PCT/ISA/237) dated Jan. 12, 2016, by the Japanese Patent Office as the International Searching Authority for International Application No. PCT/JP2015/081216.

\* cited by examiner

INTAKE APPARATUS OF INTERNAL COMBUSTION ENGINE

TECHNICAL FIELD

This invention relates to an intake apparatus of an internal combustion engine.

BACKGROUND ART

In a known intake apparatus of an internal combustion engine, a construction in which an inertia supercharging effect is utilized is known. According to the inertia supercharging effect, an EGR gas is introduced to a surge tank and a lot of intake air is suctioned into a combustion chamber by means of pulsation and resonance of the intake air. According to the intake apparatus of the internal combustion engine, in order to exercise the inertia supercharging effect, a length of an intake port from the surge tank to the combustion chamber of the internal combustion engine is necessarily secured to some extent. Thus, in a case where the EGR gas is introduced to the surge tank, time is required for the EGR gas from being introduced to the surge tank to actually enter the combustion chamber of the internal combustion engine. As a result, a difference in time between timing at which the EGR gas is introduced to the surge tank and timing at which the EGR gas is actually introduced to the combustion chamber becomes large, which leads to inconvenience where transient responsiveness of the EGR gas decreases.

Therefore, a known intake apparatus of an internal combustion engine is proposed to distribute gas to plural intake pipes which are connected to plural cylinders of the internal combustion engine so as to introduce the gas to each intake port. Such intake apparatus of the internal combustion engine is disclosed, for example, in Japanese Patent Application Publication 2006-241992 and Japanese Patent Application Publication 2003-239816, for example.

Japanese Patent Application Publication 2006-241992 discloses an intake manifold including a collection pipe (surge tank), branch pipes (intake pipes) branched into four from the collection pipe, and a gas passage connected to each of the branch pipes to distribute a PCV gas thereto. According to the intake manifold disclosed in Japanese Patent Application Publication 2006-241992, the gas passage is connected to each of the branch pipes in the vicinity of an engine. As a result, the PCV gas is configured to be introduced to the branch pipes from a PCV gas inlet port provided in the vicinity of the engine.

In addition, Japanese Patent Application Publication 2003-239816 discloses an intake manifold including branch passages (intake pipes) which are connected to a collector (surge tank) and to a cylinder head and which are branched into four. The intake manifold disclosed in Japanese Patent Application Publication 2003-239816 includes a collector-side flange portion provided at a connection portion between the branch passages and the collector. A distribution path supplied with a PCV gas and branch paths introducing the PCV gas to the respective branch passages from the distribution path are provided at the collector-side flange portion. That is, the PCV gas is configured to be introduced to the branch passages from a PCV gas inlet port provided in the vicinity of the collector.

The construction of each of the PCV gas inlet ports disclosed in Japanese Patent Application Publication 2006-241992 and Japanese Patent Application Publication 2003-239816 is applicable to a construction of an EGR gas inlet port.

DOCUMENT OF PRIOR ART

Patent Document

Patent document 1: Japanese Patent Application Publication 2006-241992
Patent document 2: Japanese Patent Application Publication 2003-239816

OVERVIEW OF INVENTION

Problem to be Solved by Invention

In a case where the EGR gas inlet port is provided in the vicinity of the engine by employing the construction of the intake manifold disclosed in Japanese Patent Application Publication 2006-241992, the transient responsiveness of the EGR gas improves. Nevertheless, the predetermined branch pipe is in communication with the other branch pipes via the gas passage in a region where a negative pressure applied to the intake air in the vicinity of the engine is large. Thus, inconvenience is caused by an increase of a degree of interference between the intake air at the predetermined branch pipe and the intake air that enters from the other branch pipes. Therefore, the inertia supercharging effect decreases because a flow of intake air is greatly disturbed, which leads to a decrease of an amount of air which is taken into the combustion chamber of the engine. Consequently, an issue that torque at the engine decreases may occur.

In addition, in a case where the EGR gas inlet port is provided in the vicinity of the collector by employing the construction of the intake manifold disclosed in Japanese Patent Application Publication 2003-239816, a degree of interference between the intake air at the predetermined branch passage and the intake air that enters from the other branch passages is small. Nevertheless, because of backflow of the EGR gas to the collector, inconvenience is caused by a gas flow to the other branch passages via the collector. Thus, an issue that an amount of EGR gas distributed to the respective branch passages varies may occur.

The present invention is made in view of the drawback mentioned above. One object of the invention is to provide an intake apparatus of an internal combustion engine which may restrain an amount of EGR gas distributed to respective intake pipes is inhibited from varying while torque at the internal combustion engine is restrained from decreasing by restraining a decrease of an inertia supercharging effect.

Means for Solving Problem

In order to achieve the aforementioned object, an intake apparatus of an internal combustion engine according to an aspect of the invention includes an intake apparatus body including plural intake pipes which are connected to plural cylinders provided at an internal combustion engine and a surge tank arranged at an upstream side of the plural intake pipes, an EGR gas distribution passage including plural EGR gas distribution pipes which include EGR gas inlet ports respectively distributing an EGR gas to each of the plural intake pipes, a length of an intake port from the surge tank to a combustion chamber of the internal combustion engine including a length for exercising an inertia supercharging effect, and each of the EGR gas inlet ports of the plural EGR gas distribution pipes being provided at a position at which a volume of the intake port from the surge tank to each of the EGR gas inlet ports is equal to or greater than a volume of an EGR gas introduced to each of the plural intake pipes from each of the plural EGR gas distribution pipes during one cycle of the internal combustion engine and at a position towards the surge tank relative to a center of the intake port in a flow direction thereof.

According to the intake apparatus of the internal combustion engine according to the aspect of the invention, even in a case where the EGR gas flowing into the intake pipe flows backwards to the surge tank after a completion of a suction stroke of the internal combustion engine, the EGR gas within the intake port is suctioned to the combustion chamber of the internal combustion engine in the suction stroke of a next cycle of the internal combustion engine before the EGR gas flows into the surge tank. The EGR gas is therefore restrained from flowing into the surge tank. The EGR gas distributed to the intake port is restrained from flowing to the other intake port via the surge tank. Variations in amount of EGR gas distributed to the respective intake pipes are restrained. Further, because the EGR gas is not introduced to the surge tank, the inertia supercharging effect of the EGR gas is also restrained from decreasing. In addition, the EGR gas inlet port of each of the plural EGR gas distribution pipes is provided at the position towards the surge tank relative to the center of the intake port in the flow direction thereof. Thus, as compared to a case where the EGR gas inlet port is provided at a position towards the internal combustion engine relative to the center of the intake port in the flow direction thereof, the EGR gas inlet port is provided at the position sufficiently separated from the internal combustion engine. A degree of interference between the intake air of the predetermined intake port and the intake air from the other intake port may decrease. Thus, the decrease of inertia supercharging effect because a flow of intake air is greatly disturbed is restrained, which may restrain a decrease of amount of air taken into the combustion chamber of the internal combustion engine. Consequently, a decrease of torque at the internal combustion engine may be restrained.

In the intake apparatus of the internal combustion engine according to the aforementioned aspect, favorably, each of the EGR gas inlet ports of the plural EGR gas distribution pipes is provided at a position specified by a formula (1) below and at a position towards the surge tank relative to the center of the intake port:

(Mathematical 1) $Le = Vs \times Re \times C/Se$      (1)

wherein Le is a length of the intake port from the surge tank to each of the EGR gas inlet ports, Vs is a stroke volume per cylinder (equal to a displacement per cylinder), Re is an EGR rate (in a state where 100% is specified to be one) serving as a rate of an EGR gas contained in air suctioned to the combustion chamber of the internal combustion engine, C is a coefficient equal to or greater than one, Se is a cross-sectional area of the intake port from the surge tank to each of the EGR gas inlet ports.

Because of such construction, the EGR gas inlet port is provided at the position specified by the formula (1) so that the EGR gas is restrained from flowing into the surge tank. The variations in amount of EGR gas distributed to the respective intake pipes are restrained from occurring.

In this case, favorably, each of the EGR gas inlet ports of the plural EGR gas distribution pipes is provided at the position specified by the formula (1) in a case where the coefficient C is in a range from 1.1 to 1.5, inclusive.

Because of such construction, the EGR gas inlet port is provided at the position specified by the formula (1) in a case where the coefficient C is equal to or greater than 1.1 so as to securely restrain the EGR gas from flowing into the surge tank. The EGR gas inlet port is provided at the position specified by the formula (1) in a case where the coefficient C is equal to or smaller than 1.5 so that the position of the EGR gas inlet port is securely provided towards the surge tank relative to the center of the intake port in the flow direction thereof. The EGR gas inlet port may be securely provided at the position sufficiently separated from the internal combustion engine.

In the intake apparatus of the internal combustion engine according to the aforementioned aspect, favorably, the EGR gas distribution passage including the EGR gas distribution pipes is provided being horizontally or making a downward slope towards a downstream of the EGR gas distribution passage, each of the EGR gas inlet ports being positioned at a lowest portion of the EGR gas distribution pipe.

Because of such construction, a condensation water generated by condensation of water contained in the EGR gas at a low temperature environment is restrained from remaining within the EGR gas distribution passage. It is restrained that a lot of condensation water which remains at the EGR gas distribution passage is suctioned at one time into the combustion chamber via the intake pipe because of a rapid high revolution of the internal combustion engine, for example.

In the intake apparatus of the internal combustion engine according to the aforementioned aspect, favorably, the EGR gas distribution passage is integrally provided with the intake apparatus body.

Because of such construction, a wall may be shared between the EGR gas distribution passage and the intake apparatus body. As a result, the intake apparatus may include a lightweight and downsized configuration.

In the intake apparatus of the internal combustion engine according to the aforementioned aspect, favorably, the length of the intake port from the surge tank to the combustion chamber of the internal combustion engine includes a length for exercising the inertia supercharging effect in a state being equal to or greater than a length L specified by a formula (2) below:

(Mathematical 2) $$L = \left(\frac{a \times \theta}{12\pi \times N}\right)^2 \times \frac{Sp}{V} \qquad (2)$$

wherein α is a speed of sound (m/s), θ is an operation angle (degree) of an intake valve of the internal combustion engine, N is a rotation number (rpm) of the internal combustion engine at a maximum torque point of the internal combustion engine, Sp is a cross-sectional area (m$^2$) of the intake port, V is a volume (m$^3$) of the combustion chamber of the internal combustion engine per cylinder.

Because of such construction, the intake port may be provided to include the length with which the inertia supercharging effect is exercised at least at the maximum torque point of the internal combustion engine.

MODE FOR CARRYING OUT THE INVENTION

An embodiment of the present invention is explained as below with reference to drawings.

A construction of an intake apparatus 100 of an in-line four-cylinder engine 110 (example of an internal combustion engine) according to the embodiment of the invention is explained with reference to FIGS. 1 to 7. In the following, the explanation is made in a state where the cylinders are disposed along an X axis based on the in-line four-cylinder engine 110, a direction orthogonal to the X axis in a horizontal plane corresponds to a Y axis, and a Z axis corresponds to an up-down direction.

Figure 1:
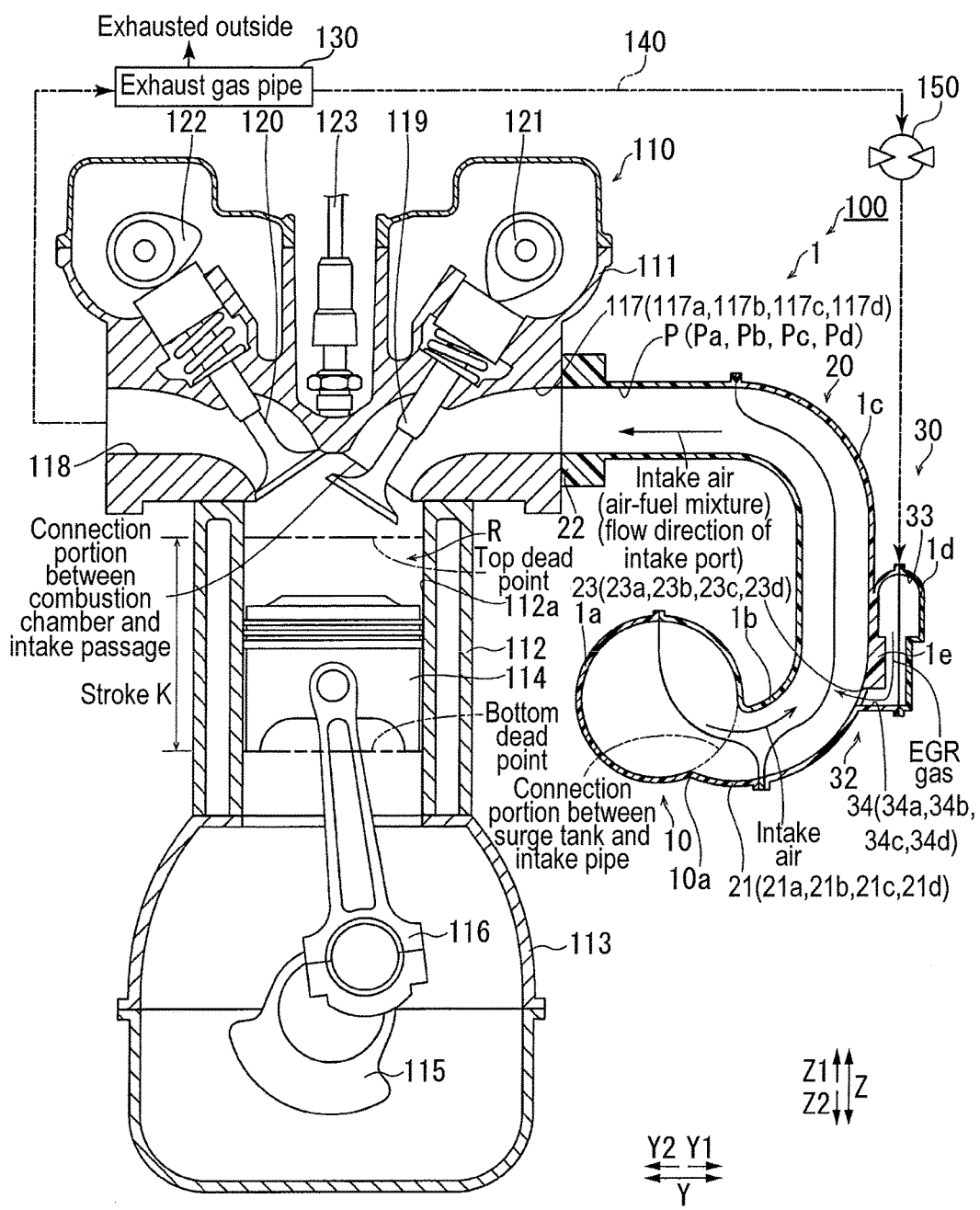
FIG. 1 is a cross-sectional view illustrating a state where an intake apparatus according to an embodiment of the invention is mounted to an engine.

The intake apparatus 100 of the embodiment of the invention is mounted to the in-line four-cylinder engine 110 as illustrated in FIG. 1. The four cylinders of the engine 110 are disposed side by side in an X direction (see FIG. 2) from a back side (X1 side) to a front side (X2 side) of a paper surface on which FIG. 1 is drawn. The intake apparatus 100 is constituted by an intake apparatus body 1 and an EGR gas distribution portion 30 mounted to the intake apparatus body 1.

The intake apparatus body 1 is constituted by a surge tank 10 and an intake pipe portion 20 disposed at a downstream side of the surge tank 10. In the intake apparatus body 1, intake air flows to the surge tank 10 via an air cleaner (not illustrated) serving as an intake passage and a throttle valve (not illustrated).

The surge tank 10 and the intake pipe portion 20 are both made of resin (polyamide resin). The intake apparatus body 1 and the EGR gas distribution portion 30 are integrally provided in a state where a first piece 1a, a second piece 1b, a third piece 1c and a fourth piece 1d which are made of resin are joined by vibration welding. At this time, the first piece 1a constitutes substantially a half of the surge tank 10 and the second piece 1b constitutes substantially a remaining half of the surge tank 10 and substantially a half of the intake pipe portion 20 connected to the surge tank 10. The third piece 1c constitutes a half of the intake pipe portion 20 and a half of the EGR gas distribution portion 30. The fourth piece 1d constitutes substantially a half of the EGR gas distribution portion 30. Accordingly, the EGR gas distribution portion 30 is provided being integral with the intake apparatus body 1 at a Y1 side of the intake apparatus body 1. As a result, a wall 1e is shared between the intake apparatus body 1 and the EGR gas distribution portion 30.

The intake pipe portion 20 includes a function to distribute the intake air stored in the surge tank 10 to each of the four cylinders of the engine 110. An arrow Z2 direction in the intake pipe portion 20 corresponds to an upstream side of the intake air connected to the surge tank 10. An arrow Z1 direction in the intake pipe portion 20 corresponds to a downstream side of the intake air connected to the engine 110 (cylinder head 111).

Figure 2:
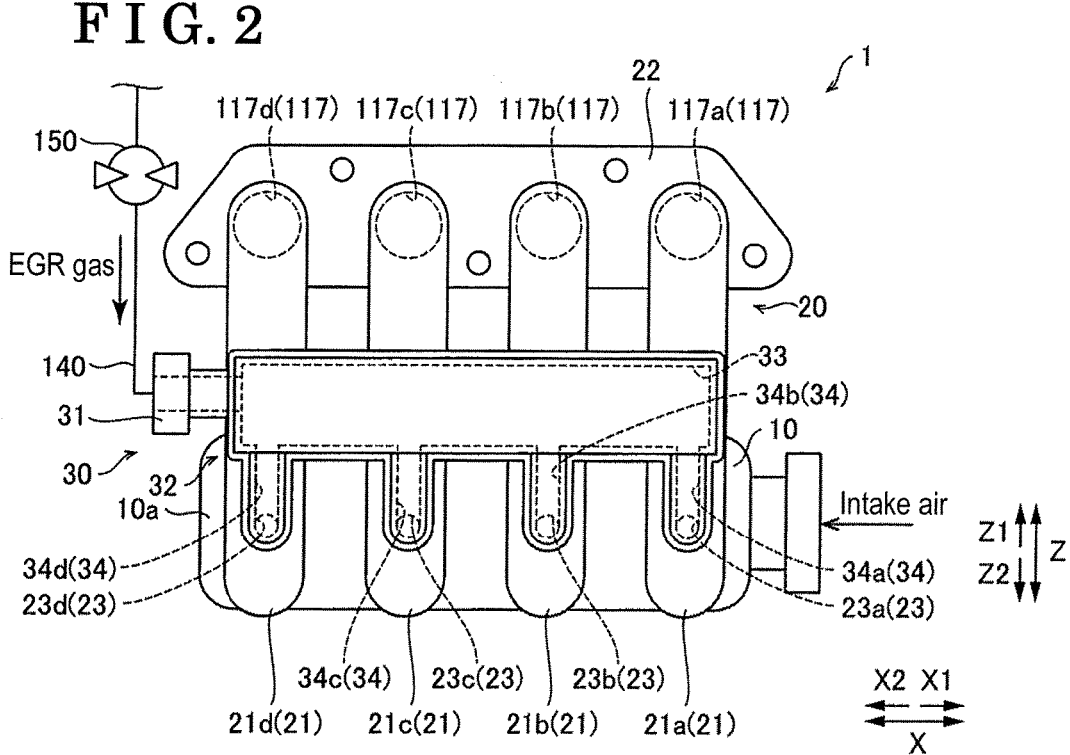
FIG. 2 is a front view illustrating the intake apparatus according to the embodiment of the invention.

As illustrated in FIG. 2, the surge tank 10 is provided extending along a line of the cylinders (X direction) of the engine 110 (see FIG. 1). The intake pipe portion 20 includes four intake pipes 21 (intake pipes 21a, 21b, 21c and 21d). The intake pipes 21a, 21b, 21c and 21d are disposed side by side in the mentioned order from the X1 side. That is, the intake pipes 21a to 21d are arranged along the line of the cylinders of the engine 110 and are connected to the corresponding cylinders respectively.

Figure 3:
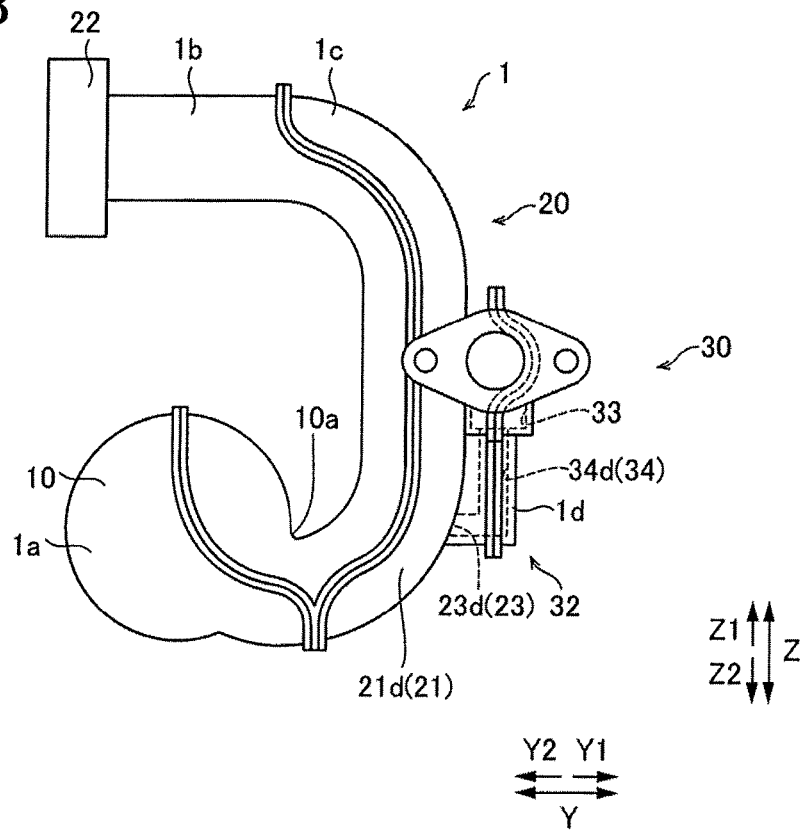
FIG. 3 is a side view illustrating the intake apparatus according to the embodiment of the invention.

As illustrated in FIGS. 2 and 3, one end of each of the intake pipes 21 (Z2 side) is connected to a side portion 10a of the surge tank 10. That is, the surge tank 10 is disposed at the upstream side of the intake pipes 21. The other end (Z1 side) of each of the intake pipes 21 is connected to the cylinder head 111 via a common flange portion 22. The flange portion 22 is integrally provided at the second piece 1b as illustrated in FIG. 3. In FIG. 2, the illustration of the engine 110 positioned at a back side (Y2 side, see FIG. 1) of a paper surface on which FIG. 2 is drawn relative to the intake apparatus body 1 is omitted for convenience. In FIG. 3, the illustration of the engine 110 positioned at the Y2 side relative to the intake apparatus body 1 is omitted for convenience.

As illustrated in FIG. 1, the engine 110 includes the cylinder head 111, a cylinder block 112 and a crankcase 113. Four cylinder portions 112a corresponding to the four cylinders are provided at an inner portion of the cylinder block 112. The cylinder portions 112a are provided extending in the up-down direction (Z direction). Four pistons 114 corresponding to the respective four cylinders are arranged at the respective four cylinder portions 112a so that each of the pistons 114 is slidable in the Z direction from a top dead point to a bottom dead point.

A crankshaft 115 is arranged extending along the line of the cylinders (X direction) at an inner portion of the crankcase 113. The pistons 114 corresponding to the respective four cylinders are configured to slide at the respective cylinder portions 112a in the Z direction by a drive force from the crankshaft 115 transmitted via a con rod 116.

Combustion chambers R corresponding to the respective four cylinders are provided at the inner portion of the engine 110 by the cylinder head 111, the cylinder portions 112a and the pistons 114. A volume V of each of the combustion chambers R is a volume of a void obtained by the cylinder head 111, each of the cylinder portions 112a and each of the pistons 114 in a case where each of the pistons 114 is positioned at the bottom dead point. The volume V is generally 1.1 times as large as a volume (stroke volume Vs) in a stroke K from the bottom dead point to the top dead point of the piston 114. The stroke volume Vs corresponds to a displacement per cylinder. The stroke volume Vs is calculated on a basis of a cross-sectional area Ss of the cylinder portion 112a and the stroke K as follows: Vs=Ss×K.

Four intake passages 117 (intake passages 117a, 117b, 117c and 117d) and four exhaust passages 118 are provided at the cylinder head 111 so as to correspond to the respective four cylinders. Each of the intake passages 117 includes a function to connect between the combustion chamber R and the intake pipe 21. The intake pipe 21 and the intake passage 117 constitute an intake port P of each of the cylinders. Specifically, the intake pipes 21a, 21b, 21c, 21d and the intake passages 117a, 117b, 117c, 117d constitute intake ports Pa, Pb, Pc, Pd of the respective cylinders. The intake port P corresponds to a region from a connection portion between the surge tank 10 and the intake pipe 21 to a connection portion between the intake passage 117 and the combustion chamber R. The four intake ports Pa, Pb, Pc and Pd include substantially the same configurations and therefore include substantially the same entire lengths Lp (see FIGS. 5 and 6). In addition, each of the exhaust passages 118 includes a function to connect between the combustion chamber R and an exhaust gas pipe 130.

Four intake valves 119 and four exhaust valves 120 are provided at the cylinder head 111 so as to correspond to the respective four cylinders. Each of the intake valves 119 includes a function to open and close the connection portion between the intake passage 117 and the combustion chamber R. Each of the exhaust valves 120 includes a function to open and close a connection portion between the exhaust passage 18 and the combustion chamber R. In addition, camshafts 121 and 122 are disposed at an upper side of each of the intake valve 119 and the exhaust valve 120 so as to extend along the line of the cylinders (X direction). Rotations of the camshafts 121 and 122 cause the intake valve 119 and the exhaust valve 120 respectively to move so that the aforementioned connection portions are configured to open and close. A spark plug 123 is mounted at the cylinder head 111 for combusting air-fuel mixture (mixture of intake air and EGR gas) within the combustion chamber R.

The engine 110 is constructed so that EGR (Exhaust Gas Recirculation) gas serving as a portion of exhaust gas emitted from the combustion chambers R recirculates via the intake apparatus body 1 and the EGR gas distribution portion 30. Specifically, one end of an EGR gas pipe 140 is connected to a portion of the exhaust gas pipe 130. The other end of the EGR gas pipe 140 is connected to the EGR gas distribution portion 30 of the intake apparatus body 1. Accordingly, the EGR gas is configured to be supplied again from the exhaust gas pipe 130 to the four combustion chambers R through the EGR gas pipe 140, the EGR gas distribution portion 30, the four intake apparatus bodies 1 and the four intake passages 117 (four intake ports P).

An EGR valve 150 is provided at a portion of the EGR gas pipe 140 for controlling a recirculation amount of the EGR gas.

The EGR gas contains water (water vapor). The EGR gas separating from the exhaust gas is normally cooled to substantially 100° C. and thereafter introduced to the intake apparatus body 1. In a cold region where an outside temperature is low, the EGR gas is further cooled so that condensation water may be generated within the EGR gas distribution portion 30.

As illustrated in FIGS. 1 and 2, the EGR gas distribution portion 30 includes a function to distribute the EGR gas which is recirculated to the engine 110 to the intake pipes 21 (intake ports P) corresponding to the respective cylinders. In this case, the EGR gas is configured to be substantially evenly distributed to the four intake ports P (intake ports Pa, Pb, Pc and Pd) so as to restrain variations in torque and horsepower between the cylinders.

As illustrated in FIG. 2, the EGR gas distribution portion 30 includes a flange portion 31 connected to the other end of the EGR gas pipe 140 and an EGR gas distribution passage 32 in which the EGR gas flows. The EGR gas distribution passage 32 is constituted by one main pipe 33 and four EGR gas distribution pipes 34 (EGR gas distribution pipes 34a, 34b, 34c and 34d) extending downward (Z2 side) from the main pipe 33. The EGR gas distribution pipes 34a, 34b, 34c and 34d are arranged side by side in the X direction in the mentioned order from the X1 side. The EGR gas distribution pipes 34a, 34b, 34c and 34d are connected respectively to the intake pipes 21a, 21b, 21c and 21d which are arranged side by side in the X direction. As a result, the EGR gas distribution pipes 34a, 34b, 34c and 34d are configured to distribute the EGR gas to the corresponding intake pipes 21a, 21b, 21c and 21d (intake ports Pa, Pb, Pc and Pd). The EGR gas distribution pipes 34a, 34b, 34c and 34d are connected to the intake pipes 21a, 21b, 21c and 21d at an EGR gas inlet port 23 (EGR gas inlet ports 23a, 23b, 23c and 23d) provided at the intake pipes 21a, 21b, 21c and 21d.

The predetermined intake port P is in communication with the other ports P via the EGR gas inlet port 23 and the EGR gas distribution passage 32.

The main pipe 33 is provided extending in a horizontal direction (X direction). The four EGR gas distribution pipes 34 extend downward at an upstream side (side facing the main pipe 33) and extend horizontally (Y2 direction) at a downstream side (side facing the intake pipe 21) as illustrated in FIGS. 1 and 3. As a result, the EGR gas distribution passage 32 is provided horizontal or making a downward slope towards the downstream (side facing the intake pipe 21). Each of the four EGR gas inlet ports 23 is positioned at the lowest portion of each of the EGR gas distribution pipes 34. The four EGR gas inlet ports 23a, 23b, 23c and 23d include substantially the same configurations.

Figure 5:
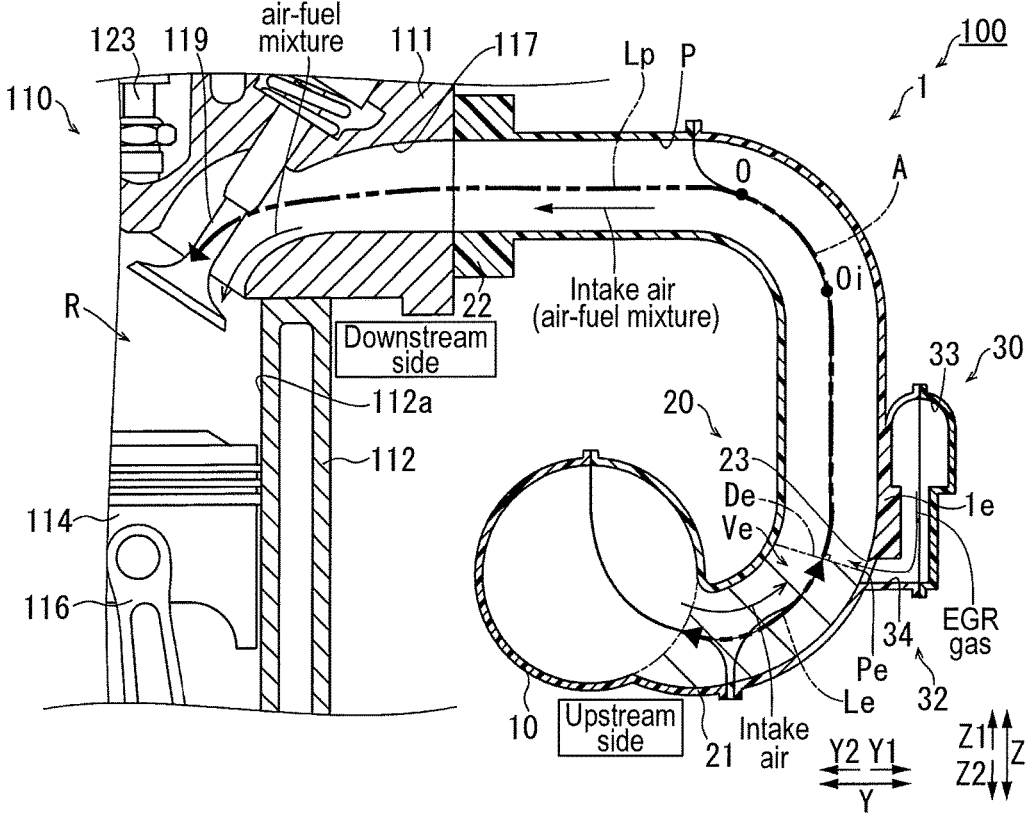
FIG. 5 is a cross-sectional view explaining a state of the intake apparatus in an intake stroke according to the embodiment of the invention.

As illustrated in FIG. 5, in the present embodiment, each of the four EGR gas inlet ports 23 is disposed at a position Pe at which a volume Ve (thin diagonal line portion in FIG. 5) of the intake port P from the surge tank 10 to the EGR gas inlet port 23 at the intake pipe 21 is equal to or greater than a volume Vi of the EGR gas introduced to the intake pipe 21 from the EGR gas distribution pipe 34 during one cycle of the engine 110.

The volume Vi of the EGR gas introduced to the intake pipe 21 from the EGR gas distribution pipe 34 during one cycle of the engine 110 may be calculated on a basis of a volume of air-fuel mixture suctioned into the combustion chamber R during one cycle (i.e., so-called a stroke volume Vs) and a rate of EGR gas contained in the aforementioned air-fuel mixture (i.e., EGR rate Re) as follows: $Vi = Vs \times Re$.

Figure 4:
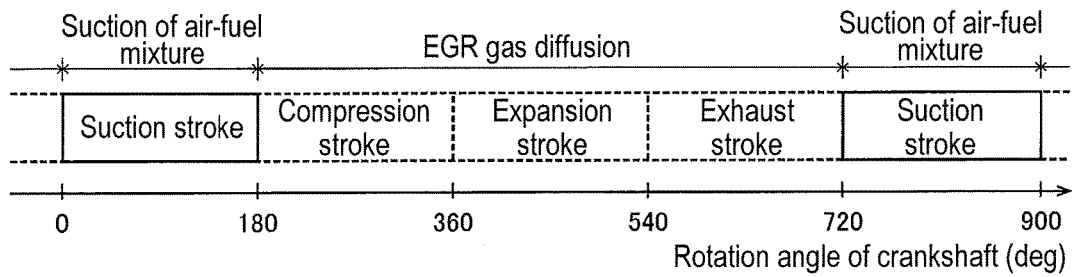
FIG. 4 is a schematic view explaining a cycle of the engine according to the embodiment of the invention.

As illustrated in FIG. 4, one cycle of the engine 110 is constituted by four strokes of a suction stroke where the air-fuel mixture is suctioned into the combustion chambers R of the engine 110, a compression stroke where the air-fuel mixture within the combustion chambers R is compressed, an expansion stroke where the air-fuel mixture which is ignited is burnt so that combustion gas is expanded, and an exhaust stroke where combustion gas from the combustion chambers R of the engine 110 is exhausted as exhaust gas. The engine 110 is configured so that the piston 114 is lowered to the bottom dead point in each of the suction stroke and the expansion stroke, and is raised to the top dead point in each of the compression stroke and the exhaust stroke. At this time, the intake valve 119 opens only in the suction stroke (see FIG. 5) and the exhaust valve 120 opens only in the exhaust stroke.

Figures 6, 7:
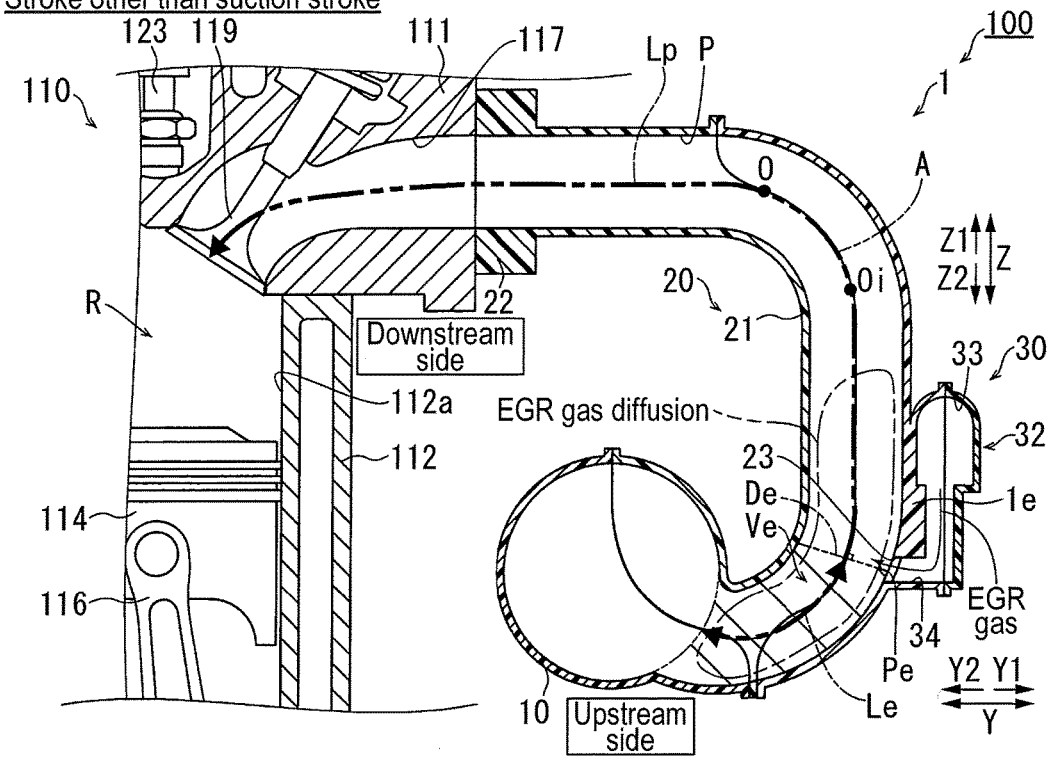
FIG. 6 is a cross-sectional view explaining a state of the intake apparatus in strokes other than the intake stroke according to the embodiment of the invention.
FIG. 7 is a graph illustrating variations in EGR rate between cylinders relative to a length of an intake port from a surge tank to an EGR gas inlet port.

In the three strokes (compression stroke, expansion stroke and exhaust stroke) other than the suction stroke, as illustrated in FIG. 6, the EGR gas (air-fuel gas) is inhibited from being suctioned into the combustion chamber R. Thus, the EGR gas continues to flow into the intake pipe 21 via the EGR gas inlet port 23. At this time, the EGR gas is dispersed and spread while being mixed with air within the intake pipe 21 to both the downstream side (towards the engine 110) and the upstream side (towards the surge tank 10) relative to the EGR gas inlet port 23.

At this time, in the embodiment, the volume Ve of the intake port P from the surge tank 10 to the EGR gas inlet port 23 is specified to be equal to or greater than the volume Vi of the EGR gas introduced to the intake pipe 21 from the EGR gas distribution pipe 34 during one cycle of the engine 110. Thus, the air-fuel mixture containing the EGR gas is suctioned to the downstream side in the suction stroke of a next cycle as illustrated in FIG. 5 before the EGR gas reaches the surge tank 10 during the three strokes (during which the EGR gas is inhibited from being suctioned) after the suction stroke. It is restrained that the EGR flowing backwards to the surge tank 10 flows into the other intake pipes 21 via the surge tank 10.

In the embodiment, each of the four EGR gas inlet ports 23 is disposed at the position Pe of the intake pipe 21 which is specified by the following formula (1).

[Mathematical 3] $Le = Vs \times Re \times C / Se$ (1)

In the aforementioned formula (1), Le is a length of the intake port P from the surge tank 10 to the EGR gas inlet port 23. Vs is a stroke volume per cylinder (i.e., displacement per cylinder) ($m^3$). Re is the EGR rate (in a state where 100% is specified to be one) as a rate of EGR gas contained in the air-fuel mixture suctioned to the combustion chambers R of the engine 110. C is a coefficient equal to or greater than one. Se ($m^2$) is an average cross-sectional area of the intake port P from the surge tank 10 to the EGR gas inlet port 23. The EGR rate generally falls within a range from approximately 10% to approximately 30%, inclusive. The average cross-sectional area Se is calculated as follows in a case where an average diameter of the intake port P from the surge tank 10 to the EGR gas inlet port 23 is specified to be De: $Se = \pi \times (De/2)^2$.

At this time, the length of the intake port P (Le and Lp which is explained later) is a length specified on a straight line A (chain double-dashed thick line in FIGS. 5 and 6) which passes substantially a center of the intake port P in a cross-sectional direction thereof and which extends along a flow direction of the intake port P as illustrated in FIGS. 5 and 6. The position Pe of the EGR gas inlet port 23 is a position at which a straight line extending in a direction orthogonal to the flow direction of the intake port P and a side surface of the intake pipe 21 (intake port P) intersect with each other at a position specified by the length Le of the intake port P from the surge tank 10 to the EGR gas inlet port 23 on the straight line A.

The coefficient C is obtained in consideration of a degree of dispersion of the EGR gas caused by mixing of the EGR gas with the intake air which is supplied from the surge tank 10 within the intake port P after the EGR gas is introduced to the intake port P and the amount of EGR gas dispersed to the downstream side (towards the engine 110) from the EGR gas inlet port 23.

At this time, a case where the coefficient C is 1 in the formula (1) corresponds to a case where the EGR gas inlet port 23 is provided at the position Pe at which the volume Ve of the intake port P from the surge tank 10 to the EGR gas inlet port 23 is equal to the volume Vi of the EGR gas introduced to the intake pipe 21 from the EGR gas distribution pipe 34 during one cycle of the engine 110. That is, as long as the EGR gas inlet port 23 is provided at the downstream side (towards the engine 110) relative to the position Pe which is specified by the formula (1) in a case where the coefficient C is 1, the EGR gas inlet port 23 is provided at the position Pe at which the volume Ve of the intake port P from the surge tank 10 to the EGR gas inlet port 23 is equal to or greater than the volume Vi of the EGR gas introduced to the intake pipe 21 from the EGR gas distribution pipe 34 during one cycle of the engine 110.

Further, in the embodiment, each of the four EGR gas inlet ports 23 is provided at the position Pe which is positioned at the upstream side (towards the surge tank 10) relative to a center O of the intake port P in the flow direction thereof at the intake pipe 21. That is, the EGR gas inlet port 23 is provided at the position sufficiently separated from the engine 110. In addition, each of the four EGR gas inlets ports 23 is desirably provided at the position Pe at the upstream side relative to a center Oi of the intake pipe 21 in a flow direction thereof. Accordingly, the EGR gas inlet port 23 may be securely provided at the position sufficiently separated from the engine 110. The center Oi of the intake pipe 21 in the flow direction thereof corresponds to the center in the flow direction at a portion of the intake port P excluding the intake passage 117 of the engine 110.

In a case where the EGR gas inlet port is provided in the vicinity of the engine, the predetermined intake port is in communication with the other intake port via the EGR gas distribution portion at a region where a large negative pressure is applied to the intake air. Thus, a degree of interference between the intake air of the predetermined intake port and the intake air which enters from the other intake port may increase. As a result, an inertia supercharging effect may decrease because a flow of intake air is greatly disturbed. On the other hand, as in the present embodiment, the EGR gas inlet port 23 is provided at the position sufficiently separated from the engine 110. Thus, in a case where the predetermined intake port P is in communication with the other intake port P via the EGR gas distribution portion 30 at a region where a small negative pressure is applied to the intake air, a degree of interference between the intake air of the predetermined intake port P and the intake air which enters from the other intake port P is restrained from increasing. Accordingly, the flow of intake air is restrained from being greatly disturbed. The degree of interference between the intake air of the predetermined intake port P and the intake air from the other intake port P decreases substantially linearly (based on a linear function) with separation of the EGR gas inlet port 23 from the engine 110.

Each of the four EGR gas inlet ports 23 is desirably provided at the position Pe which is specified by the aforementioned formula (1) in a case where the coefficient C is in a range from 1 to 2, inclusive. In the engine 110 serving as a common engine, the position Pe specified by the aforementioned formula (1) in a case where the coefficient C is 2 is positioned towards the surge tank 10 (upstream side) relative to the center O of the intake port P in the flow direction thereof.

In addition, each of the four EGR gas inlet ports 23 is further desirably provided at the position Pe specified by the aforementioned formula (1) in a case where the coefficient C is in a range from 1.1 to 1.5, inclusive. Each of the four EGR gas inlet ports 23 is still further desirably provided at the position Pe specified by the aforementioned formula (1) in a case where the coefficient C is in a range from 1.2 to 1.4, inclusive.

As illustrated in FIG. 2, the four EGR gas inlet ports 23 are provided at substantially the same positions (substantially the same positions at each of which the length Le of the intake port P from the surge tank 10 to the EGR gas inlet port 23 is the same) at the respective intake pipes 21 in the flow direction thereof. Accordingly, substantially the identical level of inertia supercharging effect may be obtained so as to restrain a complicated control at each of the cylinders of the engine 110.

In the embodiment, the entire length Lp of the intake port P includes a length with which the inertia supercharging effect may be exercised. Here, the length with which the inertia supercharging effect may be exercised corresponds to the length with which the inertia supercharging effect is achievable at least at a maximum torque point of the engine 110. At this time, the entire length Lp of the intake port P is easily adjustable by an adjustment of the length of the intake pipe 21 in the flow direction thereof, not by an adjustment of the length of the intake passage 117 of the engine 110.

Specifically, the entire length Lp of the intake port P is provided so as to be equal to or greater than a length L specified by the following formula (2).

$$[\text{Mathematical 4}] \quad L = \left(\frac{a \times \theta}{12\pi \times N}\right)^2 \times \frac{Sp}{V} \quad (2)$$

In the aforementioned formula (2), a is a speed of sound (m/s), θ is an operation angle (degree) of the intake valve 119 of the engine 110, N is a rotation number (rpm) of the engine 110 at the maximum torque point of the engine 110, Sp is an average cross-sectional area ($m^2$) of the entire intake ports P, V is a volume ($m^3$) of the combustion chamber R of the engine 110 per cylinder (which is 1.1 times as large as the stroke volume Vs). The operation angle of the intake valve 119 corresponds to a rotational angle of the crankshaft 115 during a period where the intake valve 119 is in the open state. The maximum torque point of the engine 110 corresponds to a point at which the maximum torque is generated at the engine 110.

Next, a case where the in-line four-cylinder engine 110 includes a 2-liter displacement is assumed as an example of the embodiment so as to obtain the position Pe of the EGR gas inlet port 23.

First, the length Le (m) of the intake port P from the surge tank to the EGR gas inlet port 23 is obtained. At this time, because the in-line four-cylinder engine 110 includes the 2-liter displacement, the stroke volume Vs per cylinder is as follows: $Vs=(2/4)\times 10^{-3}=0.5\times 10^{-3}$ $m^3$. In addition, the EGR rate Re is specified to be 25% (Re=0.25) as a value for the common engine. The average diameter De of the intake port P from the surge tank 10 to the EGR gas inlet port 23 is specified to be 0.045 m. As a result, the average cross-sectional area Se ($m^2$) from the surge tank 10 to the EGR gas inlet port 23 is as follows: $Se=\pi\times(0.045/2)^2=1.59\times 10^{-3}$ ($m^2$).

Accordingly, the length Le (m) of the intake port P from the surge tank 10 to the EGR gas inlet port 23 is calculated by the aforementioned formula (1) as follows: $Le=0.5\times 10^{-3}\times 0.25\times C/1.59\times 10^{-3}=0.0786\times C$ (m).

Next, the entire length Le (m) of the intake port P is obtained. Here, because the in-line four-cylinder engine 110 includes the 2-liter displacement, the volume V ($m^3$) of the combustion chamber R of the engine 110 per cylinder is as follows: $Vs=0.5\times 10^{-3}\times 1.1=0.55\times 10^{-3}$ ($m^3$). In addition, the speed of sound a is specified to be 361 m/s serving as the speed of sound in a case where an intake air temperature is 50° C. The operation angle θ of the intake valve 119 of the engine 110 is specified to be 215 degrees serving as a common operation angle. The rotation number N of the engine 110 at the maximum torque point of the engine 110 is specified to be 5000 rpm serving as a common rotation number. The diameter De of the entire intake port P is specified to be 0.042 m serving as an average diameter of the entire intake port P serving as a common intake port. As a result, the average cross-sectional area Sp ($m^2$) of the entire intake port P is as follows: $Se=\pi\times(0.042/2)^2=1.38\times 10^{-3}$ ($m^2$).

In this case, the entire length Lp (m) of the intake port P is calculated by the aforementioned formula (2) as follows: $Lp=(361\times 215/(12\pi\times 5000))^2\times(1.38\times 10^{-3}/0.55\times 10^{-3})=0.43$ (m)

As a result, in a case of the aforementioned example, each of the four EGR gas inlet ports 23 is provided at the position Pe at which the length Le of the intake port P from the surge tank 10 to the EGR gas inlet port 23 is in a range from 0.0786 m (C=1 in the formula (1)) to 0.215 m (=Lp/2=0.43/2(m)), inclusive.

In addition, in the case of the aforementioned example, each of the four EGR gas inlet ports 23 is desirably provided at the position Pe at which the length Le is in a range from 0.0786 m (C=1 in the formula (1)) to 0.157 m (C=2 in the formula (1)), inclusive. Each of the four EGR gas inlet ports 23 is further desirably provided at the position Pe at which the length Le is in a range from 0.0865 m (C=1.1 in the formula (1)) to 0.118 m (C=1.5 in the formula (1)), inclusive. Each of the four EGR gas inlet ports 23 is still further desirably provided at the position Pe at which the length Le is in a range from 0.0943 m (C=1.2 in the formula (1)) to 0.110 m (C=1.4 in the formula (1)), inclusive.

In the case of the aforementioned example and in a case where the length of the intake passage 117 within the engine 110 is specified to be 0.13 m serving as a common length of the intake passage 117, the length of the intake pipe 21 turns to 0.30 (=0.43−0.13). As a result, each of the four EGR gas inlet ports 23 is desirably provided at the position Pe at which the length Le is in a range from 0.0786 m (C=1 in the formula (1)) to 0.150 m (=0.30/2), inclusive.

At this time, variations in EGR rate Re between the cylinders relative to the length Le of the intake port P from the surge tank 10 to the EGR gas inlet port 23 in the four-cylinder engine 110 of the aforementioned example are obtained by simulation. The variations in EGR rate Re between the cylinders in a state of the predetermined length Le are calculated by subtracting the EGR rate Re of the cylinder of which the EGR rate is minimum from the EGR rate Re of the cylinder of which the EGR rate Re is maximum. The result is shown in FIG. 7.

As shown in FIG. 7, in a range where the length Le is smaller than 100 mm, the variations in EGR rate between the cylinders increase with decrease of the length Le. On the other hand, in a rage where the length Le is greater than 100 mm, the variations in EGR rate Re between the cylinders are not greatly changed even with the increase of the length Le. Accordingly, it is confirmed that the EGR gas is restrained from flowing to the other intake port P via the surge tank 10 with the length Le equal to or greater than 100 mm and consequently the variations in EGR rate Re between the cylinders may decrease.

At this time, as mentioned above, the degree of interference between the intake air of the predetermined intake port P and the intake air which enters from the other intake port P decreases linearly (based on a linear function) with the separation of the EGR gas inlet port 23 from the engine 110. In view of the aforementioned result, the variations in EGR rate Re between the cylinders may decrease and the degree of interference may decrease in a case where the length Le is 100 mm Thus, it is confirmed that the case where the length Le is 100 mm is optimum for restraining the variations in amount of EGR gas distributed to the intake pipes 21 (intake ports P) while restraining a decrease of torque at the engine 110 by restraining a decrease of inertia supercharging effect.

In the case where the length Le is 100 mm, the coefficient C in the formula (1) is substantially 1.3. Accordingly, it is confirmed that the coefficient C in the formula (1) is desirably in a range from 1 to 2, inclusive, around substantially 1.3. Here, in the other engine 110 than the engine 110 of the aforementioned example, it is also considered that the variations in amount of EGR gas distributed to the intake pipes 21 (intake ports P) are restrained while the decrease of torque at the engine 110 is restrained by restraining the decrease of inertia supercharging effect under the condition that the coefficient C in the formula (1) falls within a range from 1 to 2, inclusive.

In the embodiment, the following effects are obtainable.

In the embodiment, as mentioned above, each of the four EGR gas inlet ports 23 is provided at the position Pe at which the volume Ve of the intake port P from the surge tank 10 to the EGR gas inlet port 23 is equal to or greater than the volume Vi of the EGR gas introduced to the intake pipe 21 from the EGR gas distribution pipe 34 during one cycle of the engine 110. Accordingly, even in a case where the EGR gas flowing into the intake pipe 21 flows backwards to the surge tank 10 (upstream side) after the completion of the suction stroke of the engine 110, the EGR gas within the intake port P is suctioned to the combustion chamber R of the engine 110 in the suction stroke of the next cycle of the engine 110 before the EGR gas flows into the surge tank 10. The EGR gas is therefore restrained from flowing into the surge tank 10. The EGR gas distributed to one of the intake ports P is restrained from flowing to the other intake ports P via the surge tank 10. The variations in amount of EGR gas distributed to the respective intake pipes 21 are restrained. Further, because the EGR gas is not introduced to the surge tank 10, the inertia supercharging effect of the EGR gas is also restrained from decreasing.

In the embodiment, the EGR gas inlet port 23 of each of the plural EGR gas distribution pipes 34 is provided at the position towards the surge tank 10 (upstream side) relative to the center O of the intake port P in the flow direction thereof. Thus, as compared to a case where the EGR gas inlet port 23 is provided at a position towards the engine 110 (downstream side) relative to the center of the intake port P in the flow direction thereof, the EGR gas inlet port 23 is provided at the position sufficiently separated from the engine 110. The degree of interference between the intake air of the predetermined intake port P and the intake air from the other intake port P may decrease. Thus, the decrease of inertia supercharging effect because the flow of intake air is greatly disturbed is restrained, which may restrain a decrease of amount of air taken into the combustion chamber R of the engine 110. Consequently, the decrease of torque at the engine 110 may be restrained.

In addition, in the embodiment, the EGR gas inlet port 23 is provided at the position specified by the aforementioned formula (1) so that the EGR gas is restrained from flowing into the surge tank 10. The variations in amount of EGR gas distributed to the respective intake pipes 21 are restrained from occurring.

Further, in the embodiment, the EGR gas inlet port 23 is provided at the position specified by the aforementioned formula (1) in a case where the coefficient C is equal to or greater than 1.1 so as to securely restrain the EGR gas from flowing into the surge tank 10. The EGR gas inlet port 23 is provided at the position specified by the aforementioned formula (1) in a case where the coefficient C is equal to or smaller than 1.5 so that the position of the EGR gas inlet port 23 is securely provided towards the surge tank 10 (upstream side) relative to the center O of the intake port P in the flow direction thereof. The EGR gas inlet port 23 may be securely provided at the position sufficiently separated from the engine 110.

Furthermore, in the embodiment, the EGR gas inlet port 23 is provided being horizontal or making a downward slope towards the downstream (towards the intake pipe 21) and each of the four EGR gas inlet ports 23 is positioned at the lowest portion of each of the EGR gas distribution pipes 34. Accordingly, the condensation water generated by condensation of water contained in the EGR gas at a low temperature environment is restrained from remaining within the EGR gas distribution passage 32. It is restrained that a lot of condensation water which remains at the EGR gas distribution passage 32 is suctioned at one time into the combustion chamber R via the intake pipe 21 because of a rapid high revolution of the engine 110, for example.

Furthermore, in the embodiment, the EGR gas distribution passage 32 is integrally provided with the intake apparatus body 1 so that the wall may be shared between the EGR gas distribution passage 32 and the intake apparatus body 1. As a result, the intake apparatus 100 may include a lightweight and downsized configuration.

Furthermore, in the embodiment, the entire length Lp of the intake port P from the surge tank 10 to the combustion chamber R of the engine 110 is specified to be equal to or greater than the length L specified by the aforementioned formula (2). Thus, the intake port P may be provided to include the length with which the inertia supercharging effect is exercised at least at the maximum torque point of the engine 110.

The embodiment and practical example (example) disclosed at this time should be considered as examples at any point and not as limitations. The scope of the present invention is indicated by the scope of claims not by the explanation of the embodiment and practical example (example) mentioned above. Further, the scope of the present invention includes equivalents to the scope of the claims and any changes (modifications) within the scope.

For example, in the aforementioned embodiment, the example where the intake apparatus 100 is mounted at the in-line four-cylinder engine 110 is explained. The present invention, however, is not limited thereto. The intake apparatus of the present invention may be mounted at an engine including plural cylinders other than the four cylinders.

In addition, in the present embodiment, the example where the four EGR gas inlet ports 23 are provided at substantially the same positions (substantially the same positions at each of which the length Le of the intake port P from the surge tank 10 to the EGR gas inlet port 23 is the same) at the respective intake pipes 21 in the flow direction thereof is described. The present invention, however, is not limited thereto. In the present embodiment, the four EGR gas inlet ports 23 may be provided at different positions from each other in the flow direction of the intake pipes. In this case, the four EGR gas inlet ports 23 are necessarily provided at positions at each of which the volume of the intake port from the surge tank to the EGR gas inlet port is equal to or greater than the volume of EGR gas introduced to the intake pipe from the EGR gas distribution pipe during one cycle of the engine and at positions towards the surge tank relative to the center of each of the intake ports in the flow direction thereof.

Further, in the aforementioned embodiment, the example where the main pipe 33 is provided extending in the horizontal direction and the EGR gas distribution pipe 34 is provided extending downward at the upstream side and extending in the horizontal direction (Y2 direction) at the downstream side is described. The present invention, however, is not limited thereto. For example, the present invention may be constructed so that the main pipe or the EGR gas distribution pipe may be provided inclining downward.

Furthermore, in the aforementioned embodiment, the example where the EGR gas distribution portion 30 is integrally provided with the intake apparatus body 1. The present invention, however, is not limited thereto. In the present embodiment, the EGR gas distribution portion may be provided separately from the intake apparatus body. As a result, replacement of only the EGR gas distribution portion may be achieved.

Furthermore, in the aforementioned embodiment, the example where the intake apparatus 100 of the present invention is employed to the in-line four-cylinder engine 110 for an automobile is described. The present invention, however, is not limited thereto. The intake apparatus 100 of the present invention may be employed to the intake apparatus of the internal combustion engine other than the engine 110 for the automobile (for example, a gas engine other than a gasoline engine (internal combustion engine such as a diesel engine and a gas engine, for example)). Regardless of whether it is the gasoline engine or not, the present invention may be employed to the intake apparatus of the internal combustion engine such as a V-type multi-cylinder engine or a horizontally opposed engine, for example, other than the in-line four-cylinder engine 110.

EXPLANATION OF REFERENCE NUMERALS 1 intake apparatus body
10 surge tank
21 intake pipe
23 EGR gas inlet port
32 EGR gas distribution passage
34 EGR gas distribution pipe
100 intake apparatus
110 engine (internal combustion engine)
119 intake valve
P intake port
R combustion chamber

The invention claimed is:

1. An intake apparatus of an internal combustion engine, comprising:
an intake apparatus body including a plurality of intake pipes which is connected to a plurality of cylinders provided at an internal combustion engine and a surge tank arranged at an upstream side of the plurality of intake pipes;
an EGR gas distribution passage including a plurality of EGR gas distribution pipes which includes EGR gas inlet ports respectively distributing an EGR gas to each of the plurality of intake pipes;
a length of an intake port from the surge tank to a combustion chamber of the internal combustion engine including a length for exercising an inertia supercharging effect; and
each of the EGR gas inlet ports of the plurality of EGR gas distribution pipes being provided at a position at which a volume of the intake port from the surge tank to each of the EGR gas inlet ports is equal to or greater than a volume of an EGR gas introduced to each of the plurality of intake pipes from each of the plurality of EGR gas distribution pipes during one cycle of the internal combustion engine and at a position towards the surge tank relative to a center of the intake port in a flow direction thereof,
wherein each of the EGR gas inlet ports of the plurality of EGR gas distribution pipes is provided at a position specified by a formula (1) below and at a position towards the surge tank relative to the center of the intake port:

$$\text{(Mathematical 1)} \quad Le = Vs \times Re \times C/Se \qquad (1)$$

wherein Le is a length (m) of the intake port from the surge tank to each of the EGR gas inlet ports, Vs is a stroke volume per cylinder (equal to a displacement per cylinder) (m3), Re is an EGR rate (in a state where 100% is specified to be one) serving as a rate of the EGR gas contained in air suctioned to the combustion chamber of the internal combustion engine, C is a coefficient equal to or greater than one, Se is a cross-sectional area (m$^2$) of the intake port from the surge tank to each of the EGR gas inlet ports.

2. The intake apparatus of the internal combustion engine according to claim 1, wherein each of the EGR gas inlet ports of the plurality of EGR gas distribution pipes is provided at the position specified by the formula (1) in a case where the coefficient C is in a range from 1.1 to 1.5, inclusive.

3. The intake apparatus of the internal combustion engine according to claim 1, wherein the EGR gas distribution passage including the EGR gas distribution pipes is provided being horizontally or making a downward slope towards a downstream of the EGR gas distribution passage, each of the EGR gas inlet ports being positioned at a lowest portion of the EGR gas distribution pipe.

4. The intake apparatus of the internal combustion engine according to claim 1, wherein the EGR gas distribution passage is integrally provided with the intake apparatus body.

5. An intake apparatus of an internal combustion engine, comprising:
an intake apparatus body including a plurality of intake pipes which is connected to a plurality of cylinders provided at an internal combustion engine and a surge tank arranged at an upstream side of the plurality of intake pipes;
an EGR gas distribution passage including a plurality of EGR gas distribution pipes which includes EGR gas inlet ports respectively distributing an EGR gas to each of the plurality of intake pipes;
a length of an intake port from the surge tank to a combustion chamber of the internal combustion engine including a length for exercising an inertia supercharging effect; and
each of the EGR gas inlet ports of the plurality of EGR gas distribution pipes being provided at a position at which a volume of the intake port from the surge tank to each of the EGR gas inlet ports is equal to or greater than a volume of an EGR gas introduced to each of the plurality of intake pipes from each of the plurality of EGR gas distribution pipes during one cycle of the internal combustion engine and at a position towards the surge tank relative to a center of the intake port in a flow direction thereof,
wherein the length for exercising the inertia supercharging effect is equal to or greater than a length L specified by a formula (2) below:

$$\text{(Mathematical 2)} \quad L = \left(\frac{a \times \theta}{12\pi \times N}\right)^2 \times \frac{Sp}{V} \quad (2)$$

wherein $\alpha$ is a speed of sound (m/s), $\theta$ is an operation angle (degree) of an intake valve of the internal combustion engine, N is a rotation number (rpm) of the internal combustion engine at a maximum torque point of the internal combustion engine, Sp is a cross-sectional area (m$^2$) of the intake port, V is a volume (m$^3$) of the combustion chamber of the internal combustion engine per cylinder.

6. The intake apparatus of the internal combustion engine according to claim 5, wherein the EGR gas distribution passage including the EGR gas distribution pipes is provided being horizontally or making a downward slope towards a downstream of the EGR gas distribution passage, each of the EGR gas inlet ports being positioned at a lowest portion of the EGR gas distribution pipe.

7. The intake apparatus of the internal combustion engine according to claim 5, wherein the EGR gas distribution passage is integrally provided with the intake apparatus body.

* * * * *